US012469065B2

(12) United States Patent
Oribio et al.

(10) Patent No.: US 12,469,065 B2
(45) Date of Patent: Nov. 11, 2025

(54) DELIVERY-RELATED SEARCH AND ANALYTICS

(71) Applicant: ADOBE INC., San Jose, CA (US)

(72) Inventors: Ronald Eduardo Oribio, Austin, TX (US); Robert William Burke, Jr., Pottsboro, TX (US); Michele Saad, Austin, TX (US); Irgelkha Mejia, Round Rock, TX (US)

(73) Assignee: ADOBE INC., San Jose, CA (US)

( * ) Notice: Subject to any disclaimer, the term of this patent is extended or adjusted under 35 U.S.C. 154(b) by 294 days.

(21) Appl. No.: 17/948,997

(22) Filed: Sep. 20, 2022

(65) Prior Publication Data
US 2024/0095800 A1     Mar. 21, 2024

(51) Int. Cl.
*G06Q 30/0601*     (2023.01)

(52) U.S. Cl.
CPC ..... *G06Q 30/0627* (2013.01); *G06Q 30/0629* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 9,824,410 B1 * | 11/2017 | Sendelbach | G06Q 10/06312 |
| 11,501,247 B1 * | 11/2022 | Sahasrabudhe | G06N 20/00 |
| 2016/0104086 A1 * | 4/2016 | Gauchat | G06Q 30/0641 |
| | | | 705/7.23 |
| 2020/0160264 A1 * | 5/2020 | Silverman | G06Q 10/08355 |

OTHER PUBLICATIONS

R. Velazquez and S. M. Chankov, "Environmental Impact of Last Mile Deliveries and Returns in Fashion E-Commerce: A Cross-Case Analysis of Six Retailers," 2019 IEEE International Conference on Industrial Engineering and Engineering Management (IEEM), Macao, China, 2019, pp. 1099-1103 (Year: 2019).*

* cited by examiner

*Primary Examiner* — Michelle T Kringen
(74) *Attorney, Agent, or Firm* — Shook Hardy & Bacon L.L.P.

(57) ABSTRACT

A search system employs arrival times with associated confidence scores as search facets for identifying items. The search system identifies a plurality of items based on search input. An arrival time and associated confidence score are determined for each item from the plurality of items. Search results are provided for the plurality of items in response to the search input. The search results are provided based at least in part on the arrival times and associated confidence scores for the plurality of items.

12 Claims, 14 Drawing Sheets

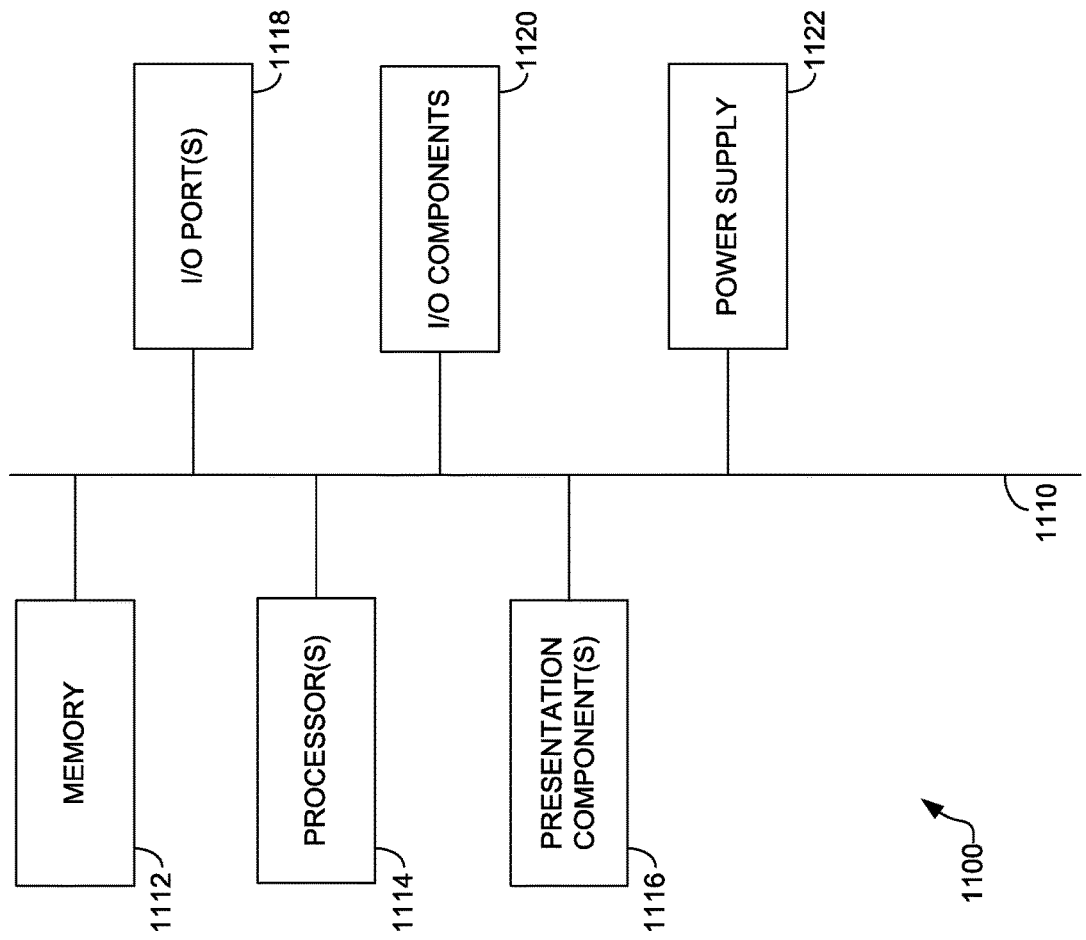

DELIVERY-RELATED SEARCH AND ANALYTICS

BACKGROUND

Search engines facilitate identifying and returning relevant items from electronic databases, such as, for instance, databases of products. Generally, search engines receive search queries from users and provide search results for items that are responsive to the search queries. For a given search query, a search engine processes the search query, as well as other parameters (e.g., user data, contextual data, and/or other inputs), to identify the most relevant items for the particular search. Search results for identified items can be presented on a user device in several different forms via a search results user interface. In some cases, search engines provide filter options to further facilitate narrowing search results and identifying relevant items.

SUMMARY

Some aspects of the present technology relate to, among other things, a search system that employs arrival time and associated confidence scores for items as a search facet. When items are identified in response to search input, such as a user query or a category browse input, an arrival time and associated confidence score for the arrival time are determined for each item. In accordance with some configurations, the arrival time and associated confidence score for an item are determined using a machine learning model trained on historical fulfillment data and historical delivery data. As such, the machine learning model is trained to predict arrival times and confidence scores for items in real-time when the user is viewing the items based on currently available information that impacts the fulfillment and delivery of the items (warehouse availability of an item, weather, traffic, fulfillment demand, delivery, demand, etc.). The arrival times and associated confidence scores for items are used to order search results (e.g., based on increasing or decreasing values for the arrival times and/or confidence scores) and/or to select/filter search results (e.g., present only search results for items that satisfy a specified arrival time with a threshold confidence score).

In further aspects, other delivery-related information, such as environmental scores and delivery costs for items, are used as search facets. An environmental score for an item indicates an environmental impact of delivering the item to a user (e.g., carbon emissions), while a delivery cost for an item comprises a cost to a user for delivering the item to the user. Environmental scores and/or delivery costs, can be used to further order and/or to select/filter search results for items in conjunction with arrival times and associated confidence scores for the items.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIGS. 2A-2C are diagrams illustrating employing arrival times with corresponding confidences for items as a search facet for sorting the items in accordance with some implementations of the present disclosure;

FIGS. 3A-3B are diagrams illustrating employing arrival times with corresponding confidences for items as a search facet for filtering/selecting items in accordance with some implementations of the present disclosure;

FIG. 11 is a block diagram of an exemplary computing environment suitable for use in implementations of the present disclosure.

DETAILED DESCRIPTION

Definitions

Figure 1:
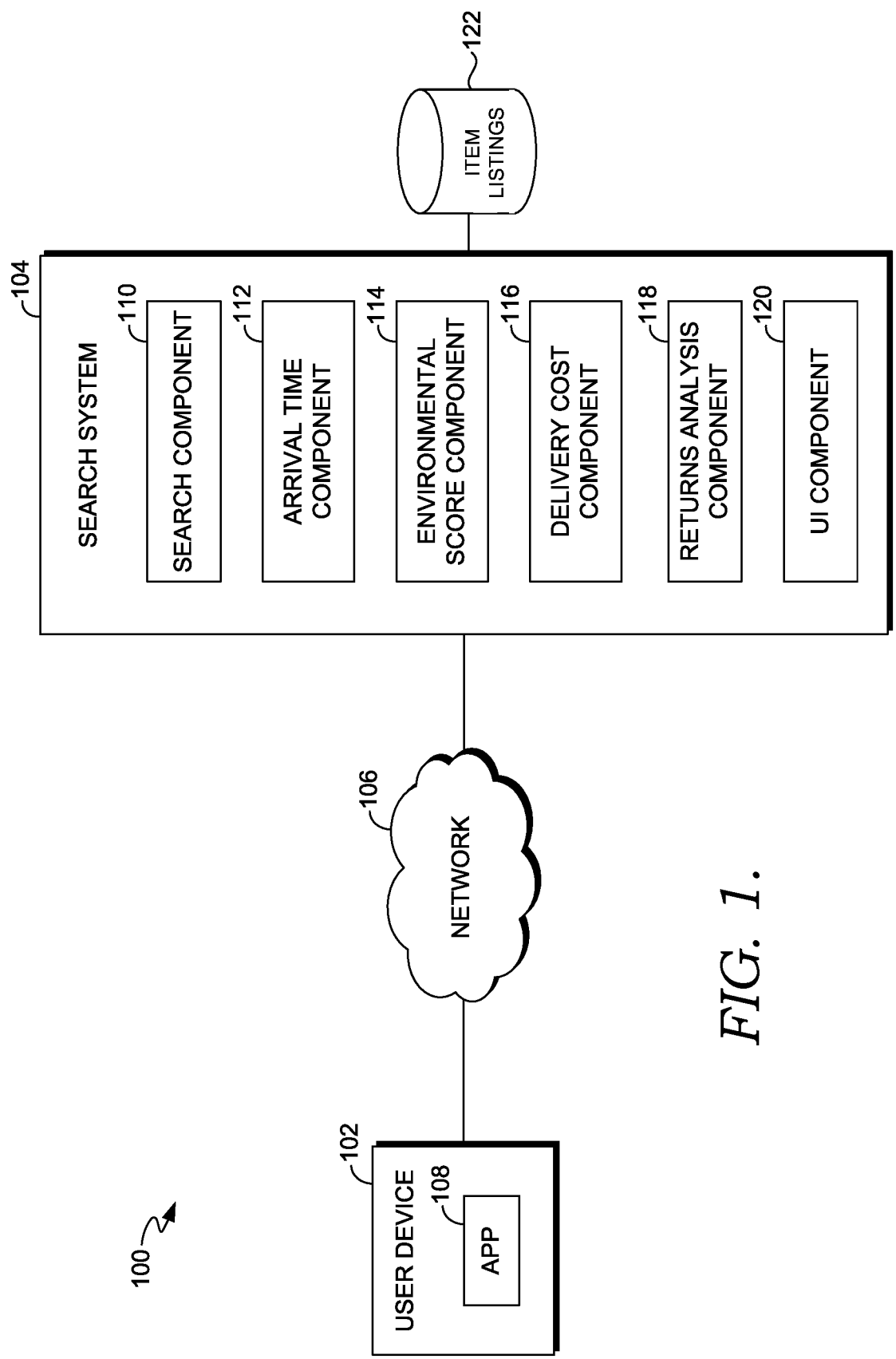
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, an "item listing" refers to a web page providing information for an item that can be returned as a search result by a search system. An item listing, can include, among other things, a title identifying the item, a textual description of the item, an image of the item, a video of the item, and one or more reviews submitted by users regarding the item. An item listing can include both unstructured data (e.g., a general text description of the item) and structured data (e.g., an indication of a particular value for a particular attribute of the item). An item listing can be provided, for instance, by a listing platform that provides items available for purchase, rental, streaming, etc.

A "listing platform" refers to a site for identifying products or services listed for purchase or rent in response to user input from a client device upon navigation to the site. A listing platform provides interfaces for surfacing of item listings as search results, such as interfaces for receiving search queries and/or filter options. In some instances, a listing platform provides interfaces for searching item listings available at one or more third-party listing platforms.

As used herein, an "arrival time" refers to a time at which an item is expected to be delivered. The arrival time can vary in specificity (e.g., year, month, day, time of day, etc.) and be comprise a range of times. In accordance with some aspects of the technology described herein, an arrival time is determined for an item in real-time in response to user input to view items. The arrival time comprises both a fulfillment time and a delivery time. A "fulfillment time" is a time from when an order for an item is placed to when the item is shipped. The fulfillment time can include a time to restock an item when an item is out of stock. A "delivery time" is a time from when an item is shipped to when the item is delivered.

A "confidence score" for an arrival time refers to a score reflecting a confidence with which an item will be delivered by the arrival time. "Confidence information" comprises information provided for presentation based on a confidence score. For example, an arrival time for an item could be determined to have a 100% confidence score. Based on the confidence score, confidence information such as "guaranteed delivery by" could be provided.

As used herein, an "environmental score" reflects an environmental impact of delivering an item to a delivery location.

As used herein, a "delivery costs" reflects a cost to a shopper to deliver the item to a delivery location.

A "delivery location" refers to a location to which an item is delivered. In some instances, a delivery location is a location of a shopper (e.g., an address specified by the shopper, such as a home or work address). In other instances, a delivery location is a pickup location at which the shopper can pick-up the item (e.g., a parcel locket).

Overview

When a user is searching for an item online, there are often a large number of sellers offering the item or similar items. This can especially be the case for sites with large catalogs of items. While search engines are incredibly useful tools for locating items, shortcomings in existing search technologies often result in the consumption of an unnecessary quantity of computing resources (e.g., I/O costs, network packet generation costs, throughput, memory consumption, etc.). When searching items online, users often desire to obtain items by a particular time (or after a particular time in some cases). For instance, a user purchasing a birthday gift will want to know the gift will arrive in time for the birthday. While some current sites allow users to choose different shipping options and provide an estimated arrival time with the various shipping options, there are shortcomings in these current approaches. For instance, the user must sift through the various search results to view the different delivery times and issue new searches until they find an item that meets their needs. Further, the estimated arrival times provided don't provide any level of certainty. This often causes users to search for items with estimated arrival times well before the items are needed.

As a result of shortcomings of conventional systems, users often have to submit multiple search queries before finding desired items. For example, a user may issue a first search query to a search engine that returns a set of search results. The user may browse the search results and select certain search results to access the corresponding items. Selection of items causes retrieval of the items from various content sources. Additionally, in some cases, applications supporting those items are launched in order to render the items. Often, the search results returned by the search engine don't satisfy the user's goal, requiring the user to spend more time on the search process by repeating the process of issuing additional search queries and selecting certain search results until the user finally accesses a desired item or, in some cases, the user gives up because the search engine was not able to return desired search results even after multiple searches.

These repetitive inputs result in increased computing resource consumption, among other things. For instance, repetitive search queries result in packet generation costs that adversely affect computer network communications. Each time a user issues a search query, the contents or payload of the search query is typically supplemented with header information or other metadata within a packet in TCP/IP and other protocol networks. Accordingly, when this functionality is multiplied by all the inputs needed to obtain the desired data, there are throughput and latency costs by repetitively generating this metadata and sending it over a computer network. In some instances, these repetitive inputs (e.g., repetitive clicks, selections, or queries) increase storage device I/O (e.g., excess physical read/write head movements on non-volatile disk) because each time a user inputs unnecessary information, such as inputting several queries, the computing system often has to reach out to the storage device to perform a read or write operation, which is time consuming, error prone, and can eventually wear on components, such as a read/write head. Further, if users repetitively issue search queries, it is expensive because processing search queries consumes a lot of computing resources. For example, for some search engines, a query execution plan may need to be calculated each time a search query is issued, which requires a search system to find the least expensive query execution plan to fully execute the search query. This decreases throughput and increases network latency, and can waste valuable time.

Aspects of the technology described herein improve the functioning of the computer itself in light of these shortcomings in existing search technologies by providing a search system that facilitates the identification of items with delivery-related information, including arrival times, meeting user requirements. More particularly, when a search system receives search input (e.g., a search query or a user browsing), the search system identifies items relevant to the search input and determines arrival times for the items. The search system then employs the arrival times as a search facet, for instance, by enabling users to filter/select and/or sort items in search results based on the arrival times. A confidence score is also determined for the arrival time for each item, and the search system can further filter/select and/or sort items using the confidence scores associated with the arrival times. For instance, items with the same arrival time can be sorted or filtered based on associated confidence scores.

In accordance with some aspects of the technology described herein, the search system determines an arrival time and confidence score using a more granular approach that estimates both a fulfillment time and delivery time for the item at the specific moment in time at which the user is searching items. As a result, the system determines an arrival time for an item at a finer scale and also determines a confidence score associated with the arrival time to provide an indication of the confidence in the determined arrival time. The fulfillment time and delivery time can be determined for an item based on statistical estimates learned from historical fulfillment-related and delivery-related data, such as warehouse and carrier behavior data and associated metadata. For instance, fulfillment times can be determined as a function of various factors, such as shopper traffic or supply-chain patterns. While the same warehouse may be shipping the same item at various times during the year, the fulfillment time varies as a function of the disparate circumstances. Similarly, delivery times can be determined as a function of numerous factors, such as the specific carrier, weather, time of year, demand, and the location of the shopper with respect to the warehouse, to name a few. Historical data, including generalized weather impacts, specific catastrophic events affecting transportation industries, and typical logistical challenges/barriers are used as inputs to determine arrival times for an item. In some configurations, a machine learning model is trained on historical fulfillment and delivery data to predict arrival times for items. The ability to apply event and performance data to machine learning allows for more dynamic and more accurate predictions of arrival times.

In some aspects, other delivery-related information, such as delivery costs and environmental scores, are determined for items and used as search facets. Delivery costs for items represents the costs to users to deliver the items, while environmental scores for items represent the environmental impact of delivering the items to users (e.g., in terms of carbon emissions). Different delivery options, such as fulfillment from different warehouses, carriers, delivery speed, and item bundling impact the delivery costs and environmental score, as well as the arrival time of items. An example would be if merchants leveraged product focused shipping solutions that incorporated ordering shipping from suppliers that shipped more products at once in a responsible manner but may be more expensive or slower. Shoppers can be given the option of additional delay or cost impact to their orders to ensure that a more environmental-friendly way is used to get their order to them from the manufacturer all the way across the distribution network to the consumer. In accordance with various aspects, the search system enables users to identify items based on various combinations of arrival times, environmental scores, and delivery costs. For instance, a user could select to view items that are guaranteed to be delivered by a specified arrival time that employ delivery options that satisfy a specified environmental score.

Aspects of the technology described herein provide a number of improvements over existing search technologies. For instance, computing resource consumption is improved relative to existing technologies. In particular, determination of arrival times and associated confidence scores for items allows the search system to employ the arrival times and confidences scores as search facets to more efficiently return relevant search results that match user intent. Determination of other delivery-related information for items, such as environmental scores and delivery costs, provide further search facets for identifying relevant items. This eliminates (or at least reduces) the repetitive search queries, search result selections, and rendering of items because the delivery-related search facets facilitate identification of search results for items with delivery-related attributes that correspond to what the user is seeking without the need to continuously input various search queries to access relevant search results. Accordingly, aspects of the technology described herein decrease computing resource consumption, such as packet generation costs. For instance, a search query (e.g., an HTTP request), would only need to traverse a computer network once (or fewer times relative to existing technologies). Specifically, the contents or payload of the search query is supplemented with header information or other metadata within a packet in TCP/IP and other protocol networks once for the initial user query. Such packet for a search query is only sent over the network once or fewer times. Thus, there is no repetitive or fewer generation of metadata and continuous sending of packets over a computer network.

In like manner, aspects of the technology described herein improve storage device or disk I/O and query execution functionality, as they only need to go out to disk a single time (or fewer times relative to existing search technologies). As described above, the inadequacy of search results from existing search technologies results in repetitive search queries, search result selections, and item renderings. This causes multiple traversals to disk. In contrast, aspects described herein reduce storage device I/O because only minimal inputs are received and so the computing system does not have to reach out to the storage device as often to perform a read or write operation. For example, the search engine can respond with search results that satisfy the user intent from a single search query (or few queries relative to existing technology). Accordingly, there is not as much wear on components, such as a read/write head, because disk I/O is substantially reduced.

Various configurations also improve query execution resource savings. Specifically, for example, the search system calculates a query execution plan on fewer search queries relative to existing search technologies. This increases throughput and decreases network latency because aspects of the technology described herein do not have to repetitively calculate query execution plans because fewer search queries need to be executed, unlike existing search technologies.

Further aspects of the technology described herein relate to providing analytics regarding returned items. In accordance with some aspects, information regarding returned items is collected. The collected information is analyzed to identify trends that can relate to why the items were returned. Insights can also be generated based on the identified trends. Further, return times can be estimated indicated when items will be returned. Analytics based on identified trends, insights, and/or return times can be provided to merchants for purposes of taking actions, such as addressing issues relating to returns, as well as restocking and resale of returned items.

Example System

With reference now to the drawings, FIG. 1 is a block diagram illustrating an exemplary system 100 for analyzing delivery-related data and employing delivery-related features as search facets in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and a search system 104. Each of the user device 102 and search system 104 shown in FIG. 1 can comprise one or more computer devices, such as the computing device 1100 of FIG. 11, discussed below. As shown in FIG. 1, the user device 102 and the search system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of user devices and server devices can be employed within the system 100 within the scope of the present technology. Each can comprise a single device or multiple devices cooperating in a distributed environment. For instance, the search system 104 could be provided by multiple server devices collectively providing the functionality of the search system 104 as described herein. Additionally, other components not shown can also be included within the network environment.

The user device 102 can be a client device on the client-side of operating environment 100, while the search system 104 can be on the server-side of operating environment 100. The search system 104 can comprise server-side software designed to work in conjunction with client-side software on the user device 102 so as to implement any combination of the features and functionalities discussed in the present disclosure. For instance, the user device 102 can include an application 108 for interacting with the search system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the search system 104 remain as separate entities. While the operating environment 100 illustrates a configuration in a networked environment with a separate user device and search system, it should be understood that other configurations can be employed in which components are combined. For instance, in some configurations, a user device can also provide search capabilities.

The user device 102 can comprise any type of computing device capable of use by a user. For example, in one aspect, the user device can be the type of computing device 1100 described in relation to FIG. 11 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user can be associated with the user device 102 and can interact with the search system 104 via the user device 102.

At a high level, the search system 104 analyzes delivery-related data and employs delivery-related features for items as search facets to filter/select items and/or sort items. In some aspects, the search system 104 leverages delivery-related data to generate returns-related analytics. As shown in FIG. 1, the search system 104 includes a search component 110, an arrival time component 112, an environmental score component 114, a delivery cost component 116, a returns analysis component 118, and a user interface component 120. The components of the search system 104 can be in addition to other components that provide further additional functions beyond the features described herein. The search system 104 can be implemented using one or more server devices, one or more platforms with corresponding application programming interfaces, cloud infrastructure, and the like. While the search system 104 is shown separate from the user device 102 in the configuration of FIG. 1, it should be understood that in other configurations, some or all of the functions of the search system 104 can be provided on the user device 102.

In one aspect, the functions performed by components of the search system 104 are associated with one or more applications, services, or routines. In particular, such applications, services, or routines can operate on one or more user devices, servers, can be distributed across one or more user devices and servers, or be implemented in the cloud. Moreover, in some aspects, these components of the search system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

In some examples, the search system 104 is part of a listing platform. Examples of listing platforms include e-commerce platforms, in which listed products or services are available for purchase by a user of a client device upon navigation to the platforms. Other examples of listing platforms include rental platforms listing various items for rent (e.g., equipment, tools, real estate, vehicles, contract employees) and media platforms listing digital content items (e.g., content for download). A listing platform can comprise any site for identifying products or services listed for purchase or rent by a user of a client device upon navigation to the site, including items that are available at one or more third-party listing platforms.

The functionality of a listing platform includes provision of interfaces enabling surfacing of item listings for items to users of the listing platform. Item listings for items available for sale/rent via the listing platform are stored by an item listings datastore 122. Each item listing can include a description relating to the item comprising one or more of a price in a currency, reviews, images of the item, shipment options, a rating, a condition of the item, a size of the item, a color of the item, etc. In aspects, the item is associated with one or more categories including meta-categories and leaf categories. For example, the meta-categories are each divisible into subcategories (or branch categories), whereas leaf categories are not divisible. In some aspects, the item listings datastore 122 comprises a search index that stores structured data regarding item listings to facilitate searching the item listings.

The search component 110 of the search system 104 facilitates identifying items in response to search input using delivery-related information as search facets. In accordance with various embodiments of the technology described herein, the search component 110 identifies items using arrival times with their associated confidence scores (as determined by the arrival time component 112 described in further detail below), environmental scores (as determined by the environmental score component 114 described in further detail below), and/or delivery costs (as determined by the cost component 116).

In some aspects, arrival times for items with their associated confidence scores are used by the search component 110 to order items presented to a user on a user device, such as the user device 102. User interface elements are provided that allow a user to choose to sort items by estimated arrival time and corresponding confidence scores. When a user selects to have items ordered based on arrival time, the search component 110 orders items based on the arrival time associated with each item and further orders items with the same arrival time based on confidence scores. For instance, a first item with a 95% confidence of being delivered by May $30^{th}$ could be ordered above a second item with a 90% confidence of being delivered by May $30^{th}$.

In some aspects, arrival times for items with their associated confidence scores are used by the search component 110 to select/filter items based on arrival times for items. User interface elements are provided that allow a user to choose to view only items with an arrival time either before or after a certain time. For instance, suppose a user wishes to receive an item by a birthday on September $23^{rd}$. The user could choose to view items with an arrival time by September $22^{nd}$, and in response, the search component 110 presents only items with an arrival time on or before that date. As another example, suppose a user wishes to receive an item after an apartment move-in date of June $21^{st}$. The user could choose to view items with an arrival time after June $21^{st}$, and in response, the search component 110 presents only items with an arrival time after that date. In some aspects, the search component 110 selects items to include for a given arrival time selected by the user based on confidence scores for the arrival time meeting a threshold. For instance, if a confidence threshold of 95% is used, items with a confidence score above that threshold for the specified date would be selected by the search component 110, while items with a confidence score below that threshold for the specified date would not be included.

When presenting items, the search component 110 can provide, for each item, an indication of the arrival time and a corresponding confidence for the arrival time. In some aspects, the indication of the confidence for an arrival time for an item is the confidence score determined for the item. For instance, an item could be displayed with an indication that the item will arrive by the arrival time with a 95% confidence. In other aspects, confidence information with other language can be used to indicate a confidence associated with an arrival time. Different confidence score thresholds could be used to cause use of different confidence information provided with items. For instance, items with confidence scores above a certain threshold could be displayed with confidence information of "Guaranteed delivery by this date." Other items having confidence scores below that threshold and above another threshold could be displayed with confidence information of "Estimated delivery by the date, but may be 1-2 business days later." Any number of thresholds and different confidence information could be used within the scope of the technology described herein.

Figure 2A:
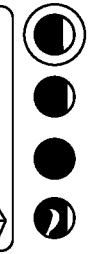
Figure 2B:
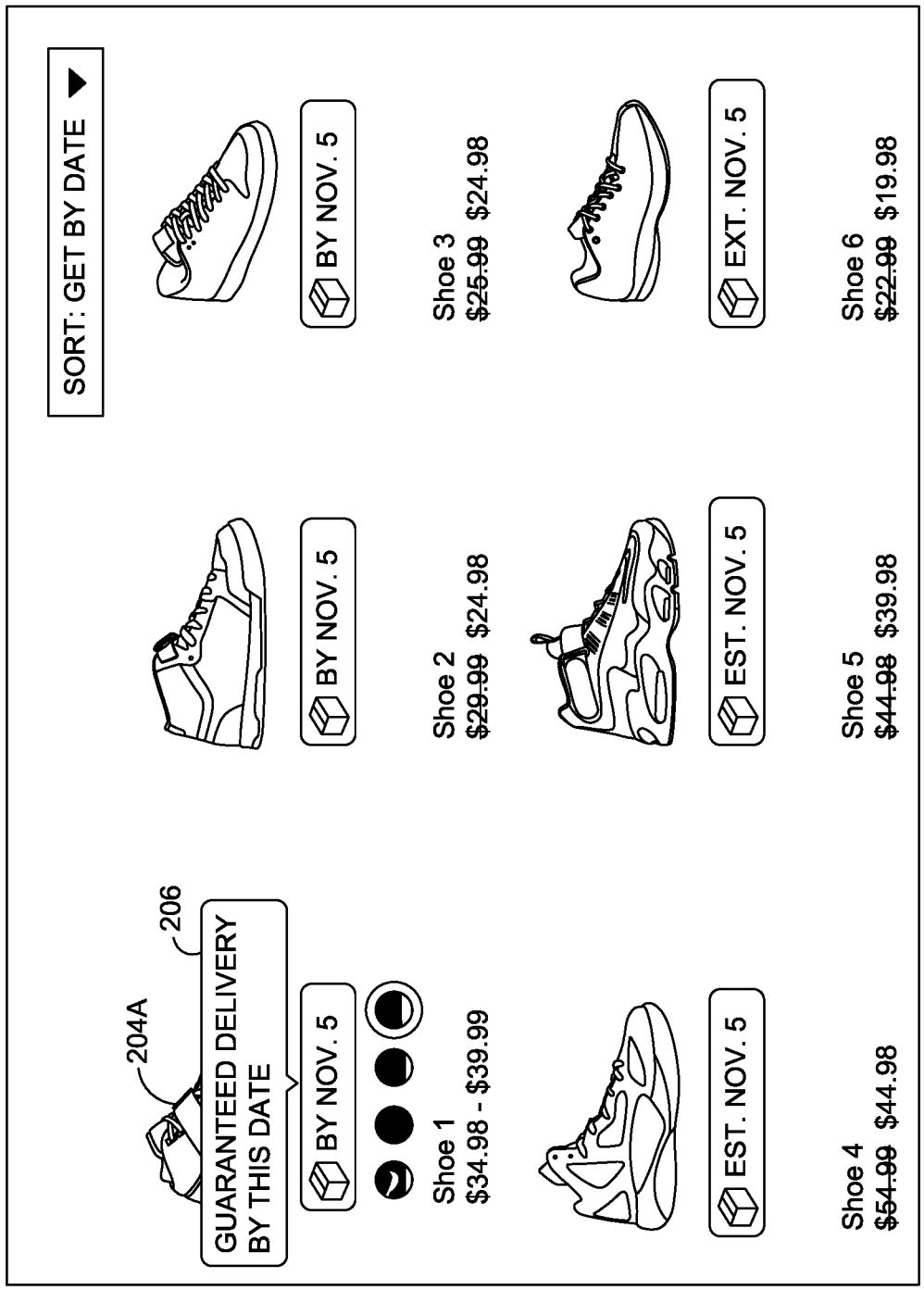
Figure 2C:
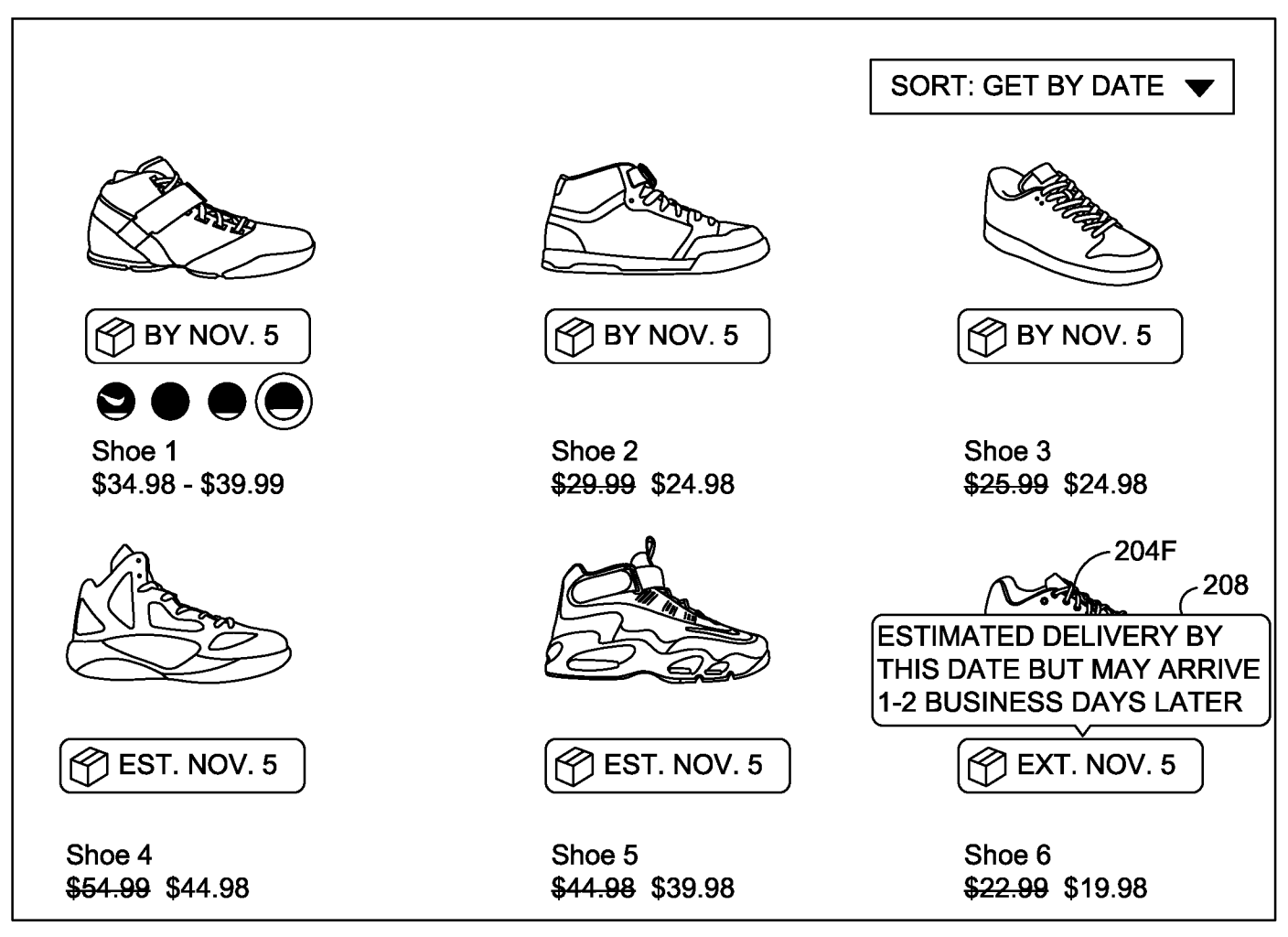

By way of illustration, FIG. 2A provides a diagram showing a search results user interface 200 in which a user has selected to view items sorted by arrival time. The search results user interface 200 includes a sort user interface element 202, in which the user has selected to sort using a "Get by date" for each item. As shown in FIG. 2A, items are sorted by arrival times and corresponding confidence scores for the arrival times. In particular, items 204A-204C have a higher confidence of being delivered by November $5^{th}$ than items 204D-204F, and, as such, items 204A-204C are sorted above items 204D-204F. The search results user interface 200 presents an indication of arrival time and corresponding confidence for each item. For items 204A-204C, an indication of "By November 5" is presented; while for items 204D-204F, an indication of "Est. November 5" is presented. Additional information and/or confidence information could be provided. For instance, as shown in FIG. 2B, if a user were to hover a cursor or otherwise interact with item 204A, confidence information 206 of "Guaranteed delivery by this date" is presented. As another example, as shown in FIG. 2C, if a user were to hover a cursor or otherwise interact with item 204F, confidence information 208 of "Estimated delivery by this date but may arrive 1-2 business days later" is presented.

Figure 3A:
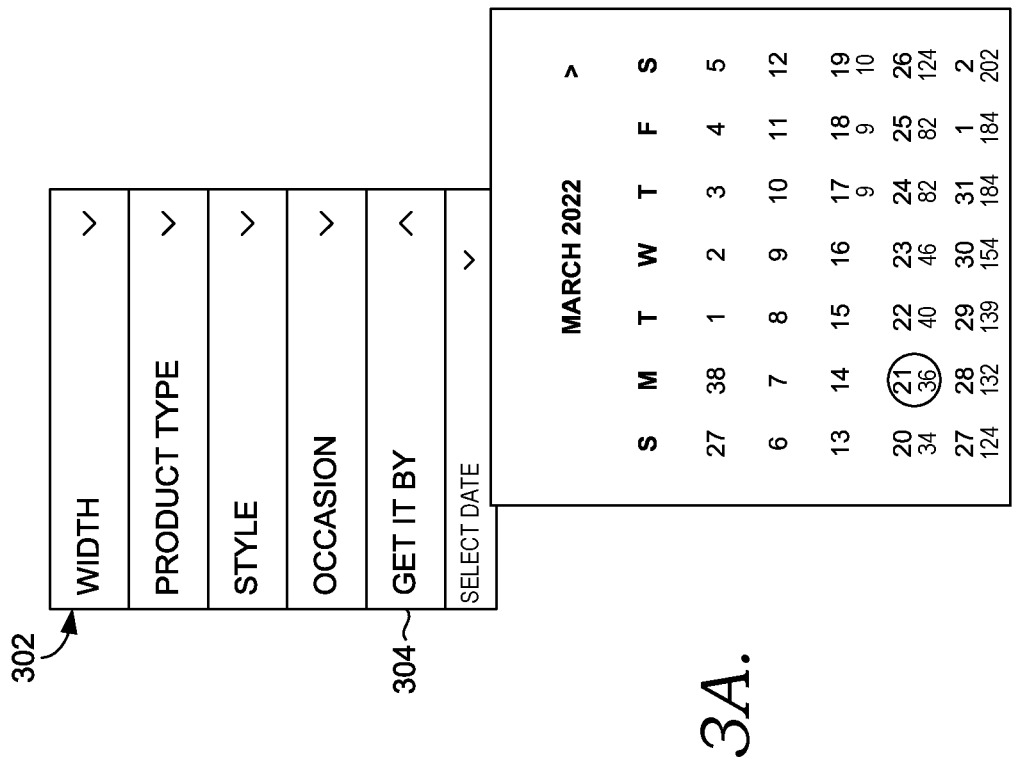
Figure 3B:
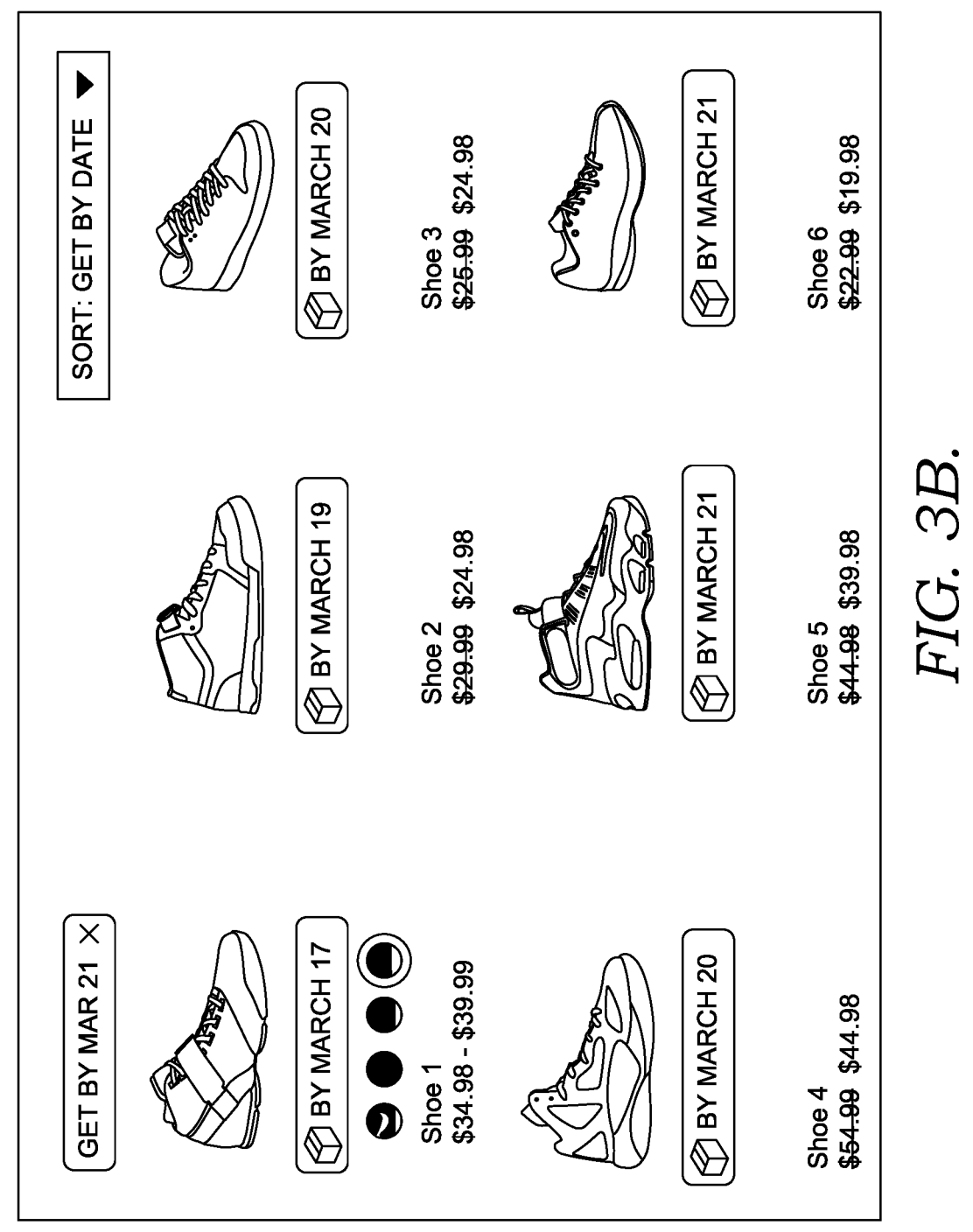

FIG. 3A provides a diagram showing a filter area 302 with filter options for filtering/selecting items. The filter area 302 can be provided for instance, on a search results user interface, adjacent to a set of search results that can be filtered using the filter options. The filter area 302 includes a "Get it by" filter option 304 that allows a user to choose a particular arrival time to view items that meet that particular arrival time. For instance, as shown in FIG. 3A, in response to a user selection of the "Get it by" filter option 304, the area is expanded to present a calendar for selecting an arrival time. The calendar provides an indication of a number of items that has an arrival time by each date. For instance, nine items have an arrival time by March $17^{th}$, while 36 items have an arrival time by March $21^{st}$. In the example of FIG. 3A, the user has selected an arrival time of March $21^{st}$. In response to the user selection, items with an arrival time by March $21^{st}$ are presented, for instance, as shown in FIG. 3B.

The search component 110 can select items for presentation in response to various combinations of filter selections and ordering inputs. For instance, continuing the example of FIGS. 3A and 3B in which the user selects to filer to view items with an arrival time of March $21^{st}$, the items selected by the search component 110 includes items with arrival times by March $21^{st}$, which includes items with earlier arrival times. After filtering by that arrival time, the items can be sorted based on arrival time. For instance, as shown in FIG. 3B, the items included in the search results user interface includes items with arrival times by March $21^{st}$ with the items being ordered based on arrival time.

In some aspects, the search component 110 orders and/or selects/filters items based on environmental scores associated with delivery of the items to shoppers. In some aspects, user interface elements are provided that allow a user to choose to sort items by environmental scores. When a user selects to have items ordered based on environmental scores, the search component 110 orders items based on the environmental scores associated with delivering each item. In some aspects, user interface elements are provided that allow a user to view only items with environmental scores that satisfy a specified environmental score. For instance, when a user selects to filter items based on environmental scores, the search component 110 identifies and presents items that satisfy the user-specified environmental score. In some cases, items can be selected by a specified environmental score, and those items can then be ordered based on their corresponding environmental scores.

In some aspects, the search component 110 orders and/or selects/filters items based on delivery costs associated with the items. In some aspects, user interface elements are provided that allow a user to choose to sort items by delivery costs. When a user selects to have items ordered based on delivery cost, the search component 110 orders items based on the delivery costs associated with delivering the items. In further some aspects, user interface elements are provided that allow a user to view only items with delivery costs that satisfy a user-specified delivery cost. When a user selects to filter items based on delivery cost, the search component 110 identifies and presents items that satisfy the user-specified delivery cost. In some cases, items can be selected by a user-specified delivery cost, and those items then ordered based on their corresponding delivery costs.

In further aspects, the search component 110 can identify items based on various combinations of arrival time, environmental score, and/or delivery costs selections. In particular, sorting options and filtering options could be provided that allow for sorting and/or filtering/selecting items based on combinations of arrival time, environmental scores, and/or delivery costs. For instance, user input could be received to filter items based on arrival time and then order items that meet that arrival time based on environmental scores and/or delivery cost. As another example, user input could be received to filter items based on environmental score and then order items that meet that environmental score based on arrival time and/or delivery cost. As a further example, user input could be received to filter items such that only items that meet any combination of a user-specified arrival time, user-specified environmental score, and/or delivery cost are provided. In some instances, a given item can have different combinations of arrival times, environmental scores, and/or delivery costs. For instance, a given item could have a first arrival time with a first environmental score and a second arrival time with a second environmental score. If items are filtered based on a selected environmental score, the arrival time for the item with a corresponding environmental score that meets the selected environmental score would be used for the item. Likewise, if items are filtered based on a selected arrival time, the environmental score for the item with a corresponding arrival time that meets the selected arrival time would be used for the item.

In further aspects, different combinations of arrival times, environmental scores, and/or delivery costs can be presented to a user for items. For instance, an item can be presented with a first option for a first arrival time corresponding with a first environmental score and/or first delivery cost, as well as a second option with a second arrival time corresponding with a second environmental score and/or second delivery cost. Each option can correspond with different fulfillment and/or delivery options (e.g., fulfilling from different warehouses, using different carriers, etc.). By providing the information, the user can chose an option based on the user's preferences.

The arrival time component 112 of the search system 104 facilitates the estimation of arrival time and associated confidence scores for items. For each item, the arrival time component 112 estimates an arrival time by which the item will be delivered to the user and a confidence score associated with the item being delivered to the user by that arrival time. The arrival time component 112 can determine the arrival time for items in real-time when the user is viewing the items. That is, the arrival time component 112 uses data currently available when the user is viewing the items to determine the arrival time for each item.

The arrival time component 112 determines an arrival time for an item by determining a fulfillment time and a delivery time for the item in some aspects of the technology described herein. The fulfillment time is a length of time from when an order is placed for the item to when the item is shipped. In some cases in which an item is currently out of stock at a particular location, the fulfillment time includes a restocking time that comprises a length of time for the item to be restocked at that location. The delivery time is a length of time from when the item is shipped to when the item is delivered to the user.

The arrival time component 112 can estimate multiple arrival times with associated confidence scores for an individual item. For instance, for a given item, the arrival time component 112 could determine an arrival time of March $24^{th}$ with an 80% confidence score and an arrival time of March $25^{th}$ with a 99% confidence score. The arrival time component 112 could then select a particular arrival time for the item from the multiple arrival times based on the associated confidence scores. For instance, an arrival time with a confidence score above or below a certain threshold could be selected for the item. In further instances, the arrival time component 112 estimates different arrival times for an item taking into account different factors, such as using different carriers and fulfilling from different warehouses. In some cases, the arrival time component 112 determines different arrival times for an item, with each arrival time being associated with a different environmental score (as determined by the environmental component 114) and/or delivery costs (as determined by the delivery cost component 116).

In accordance with various aspects of the present technology, the arrival time component 112 employs traditional multi-variate statistical analysis techniques or machine learning techniques to predict an arrival time for an item and a confidence score for that arrival time based on historical fulfillment and delivery data. In some cases, the historical data is collected on a per-item basis, allowing for the arrival time estimation for a particular item based on historical data for that particular item. In some cases, the historical data is collected on a per-category-basis, allowing for the arrival time estimation for an item of a given item type based on historical data for that item type. Aggregation of historical data at a category level addresses issues if only sparse data is available for a given item. Historical fulfillment data can include, for instance, fulfillment times, restocking delays, supply chain patterns, order demand (e.g., number of items being ordered), and seasonal aspects. Historical delivery data can include, for instance, delivery times, carrier used, weather, transportation issues (road closures, traffic, etc.), shipping demand, seasonal aspects, and logistics challenges/barriers.

Figure 4:
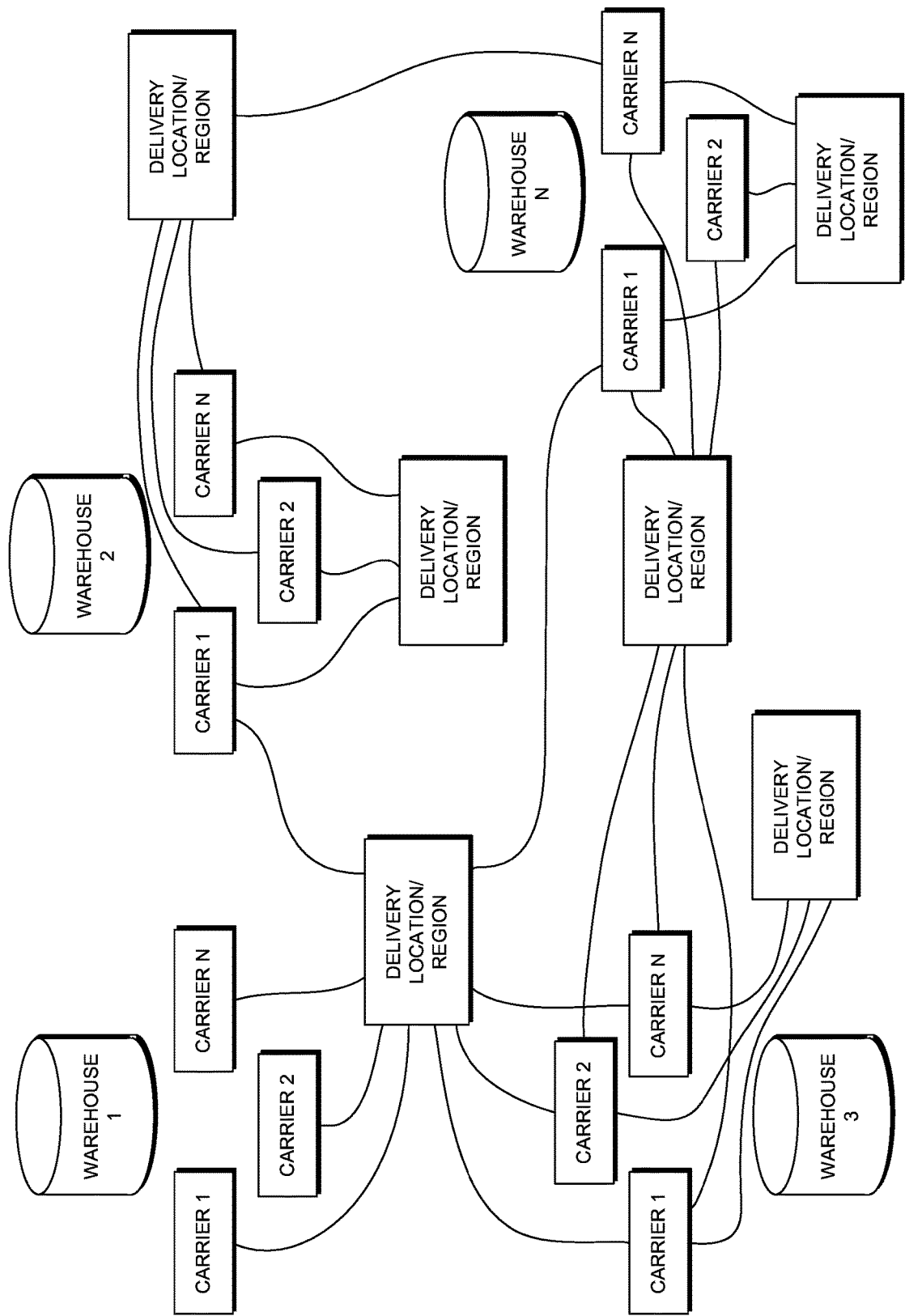
FIG. 4 is a diagram illustrating fulfillment and delivery network from which historical data can be collected in accordance with some implementations of the present disclosure.

FIG. 4 is a diagram showing an example fulfillment and delivery network from which historical data can be collected for use by the arrival time component 112 in determining arrival times for items. As shown in FIG. 4, orders from items can be fulfilled from any number of warehouses. A given item can be present in one or more warehouses. If an item is available in several warehouses, various strategies can be used when choosing the warehouse to fulfill an order. Historical fulfillment data can be collected for each of the warehouses to facilitate estimating fulfillment time by each warehouse for a given item or item type. As also shown in FIG. 4, a number of carriers can be used for delivering items from warehouses to shoppers. Historical delivery data can be collected for each of the carriers. The historical delivery data can be based on different warehouses, as well as different delivery locations/regions.

Figure 5:
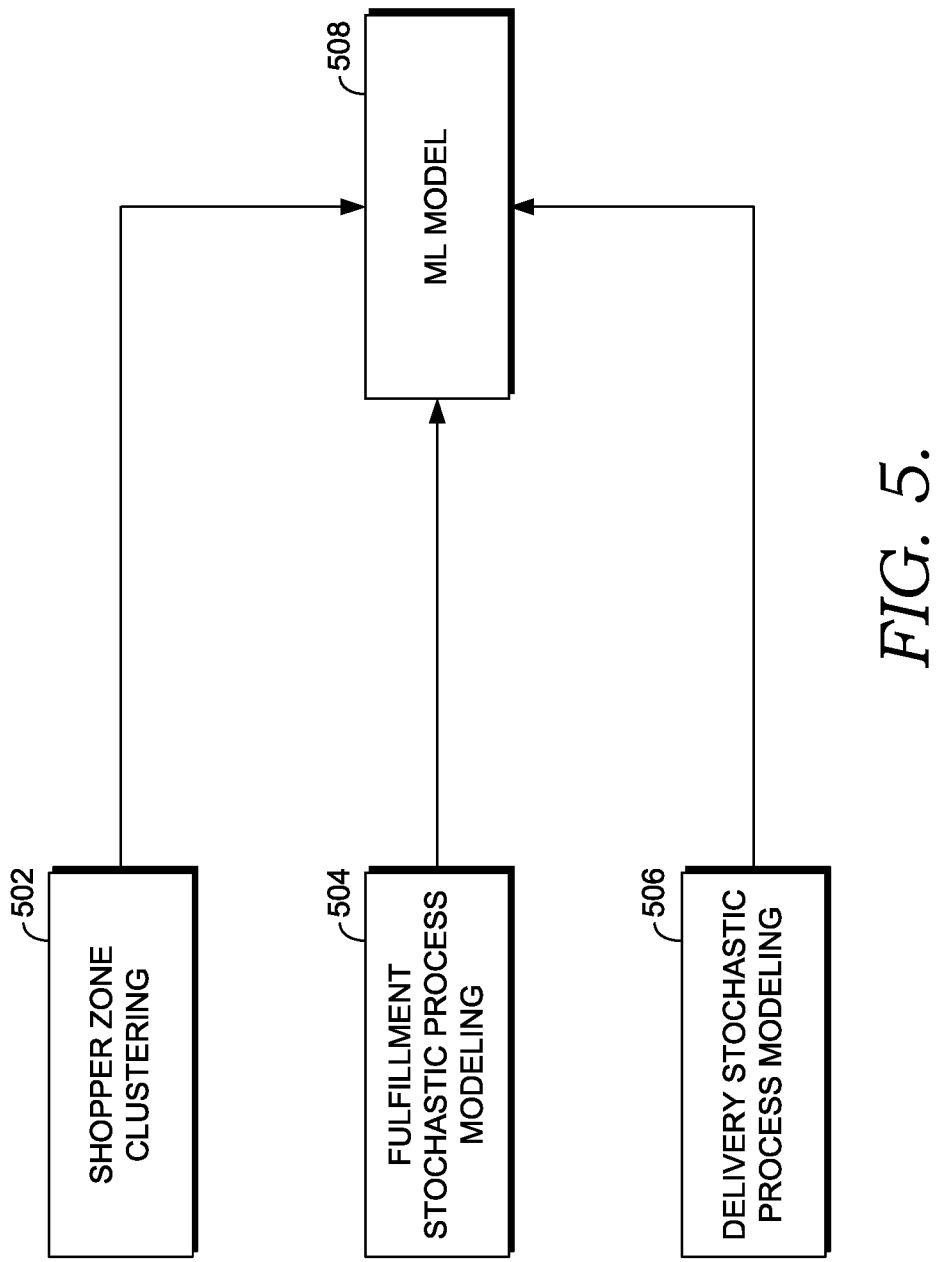
FIG. 5 is a diagram illustrating training a machine learning model to predict arrival times and associated confidence scores in accordance with some implementations of the present disclosure.

FIG. 5 illustrates one configuration in which a machine learning model (e.g., an inference model) is trained to predict arrival times and associated confidence scores. As shown at block 502, shopper zone clustering is performed. In some aspects, delivery regions are clustered into zones using an unsupervised clustering algorithm, such as, for instance, a Gaussian Mixture Model or Affinity Propagation. The features used for clustering can include zip-codes, proximity to each of the warehouses, shopper traffic density per region, the frequency with which each warehouse fulfills an item in the region, and/or other features useful for shopper zones.

Stochastic process modeling is performed for fulfillment using historical fulfillment data, as shown at block 504. This can include modeling the probability of a warehouse receiving a request to fulfil an item using a discrete probability distribution, such as, for instance, a Poisson process. This distribution approximates the number of incoming requests to a warehouse at a specific moment in time. This can be used to approximate the stress a warehouse experiences at a certain moment in time. The time it takes to fulfill each item can then be modeled using a suitable stochastic process, such as, for instance, the Gamma distribution.

Stochastic processing modeling is also performed for delivery using historical delivery data, as shown at block 506. This can include modeling each carrier's delivery times as a function of various aspects, such as, for instance, seasonality, distance from warehouse to delivery region/zone, the type of delivery service (ex. priority, express, etc.), traffic, construction, and weather.

The output from the delivery zone clustering, fulfillment stochastic process modeling, and delivery stochastic process modeling is used to train a machine learning model 508 to predict arrival times for items and corresponding confidence scores associated with the arrival times. One trained, the machine learning model 508 can be employed (e.g., by the arrival time component 112) to estimate arrival times and corresponding confidence scores for items when a user is performing a search for items.

With reference again to FIG. 1, the environmental score component 114 of the search system 104 facilitates the estimation of environmental scores associated with delivery of items. To determine an environmental score for an item, the environmental score component 114 takes into account any of a variety of factors that affect the environment impact of delivering the item to a shopper. These factors can include, for instance, a distance from a given warehouse to the shopper (or a delivery location/region for the shopper), the carrier being used, the class/speed of delivery (e.g., next day, two-day, etc.), transportation involved in the delivery (e.g., air, ground, etc.), the types of vehicles used (e.g., gas, hybrid, electric, etc.), grouping of items for delivery to a common location (for pickup by the shopper, as opposed to delivery to the specific shopper's address). In some aspects, the environmental score for a given item is based on an estimation of carbon emissions generated from delivery of that item. The environmental score component 114 can determine an environmental score (or multiple environmental scores for various alternatives) in real-time when a shopper is viewing an item.

The delivery cost component 116 facilitates the determination of the cost of delivering an item. The delivery cost of an item can be based on various factors, including delivery method, arrival time, warehouse servicing an order, alternative delivery to a pickup location (i.e., as opposed to the shopper), multi-item delivery, frequency of multi-item delivery (e.g., bi-weekly, monthly, etc.). The delivery cost component 116 can determine a delivery cost (or multiple delivery costs for various alternatives) in real-time when a shopper is viewing an item. In some aspects, delivery price differentiation is provided when a shopper allows for merchant decisioning on delivery time frame and shipping logistics.

An arrival time, environmental score, and delivery cost for a given item can be dependent upon one another. As such, the arrival time component 112, environmental score component 114, and delivery cost component 116 can interact (or be provided by a single component) in some configurations. For instance, if a particular environmental score and/or delivery cost is specified, the arrival time component 112 can determine an arrival time using fulfillment/delivery selections that satisfy the specified environmental score and/or delivery cost. Likewise, if a particular arrival time and/or delivery cost is specified, the environmental score component 114 can determine an environmental score using fulfillment/delivery selections that satisfy the specified arrival time and/or delivery cost. Further, if a particular arrival time and/or environmental score is specified, the delivery cost component 116 can determine a delivery cost using fulfillment/delivery selections that satisfy the specified arrival time and/or environmental score. In some instances, different combinations of arrival times, environmental costs, and delivery costs can be determined for a given item.

The returns analysis component 118 generates and provides analytics to merchants regarding returned items. The returns analysis component 118 collects information regarding returned items. The information collected for returned items can include, for instance, item attributes (color, size, etc.), delivery information (e.g., actual arrival time versus arrival time indicated at purchase), condition of delivered item and/or packaging (e.g., damaged), buyer demographics (e.g., geographical location, age, gender, etc.), and reasons for return submitted by buyers. The returns analysis component 118 analyzes collected information to identify trends regarding returns. This can be on a per-item basis (i.e., analyzing information for a specific item) or an item-type basis (i.e., analyzing information for a category of items). In particular, the analysis component 118 identifies trends based on correlations amongst collected information for an item/category of items. These trends can correspond to why items were returned. By way of example to illustrate, the trends can indicate delayed arrival times, poor packaging leading to damage, description of an item wasn't accurate, and product features don't match user preferences for certain demographics. The analysis component 118 can further identify insights based on the trends. This can include, for instance, information regarding actions to take to reduce returns. By way of example, the insights can include information such as how to adjust an item description, use different packaging, work with different carriers, how to target items to different demographics, and where to stock items. The returns analysis component 118 can further estimate return times so merchants know when to expect returned items for restocking and resale purposes. Various analytics determined by the returns analysis component 118, including, for instance, identified trends, insights, and return times can be provided for presentation to a merchant such that the merchant can take actions based on the analytics.

The user interface component 120 of the search system 104 provides one or more user interfaces for interacting with the search system 104. For instance, the user interface component 120 can provide user interfaces to a user device, such as the user device 102, that are presented on the user device 102 using the application 108. Among other things, the user interfaces provided by the user interface component 120 can enable a user to interact with the search system 104 to search for items, including filtering/selecting and/or sorting items based on delivery-related features, including arrival times, environmental scores, and delivery costs. In further configurations, the search system 104 can provide user interfaces to a merchant that provide analytics regarding returned items.

Example Methods

Figure 6:
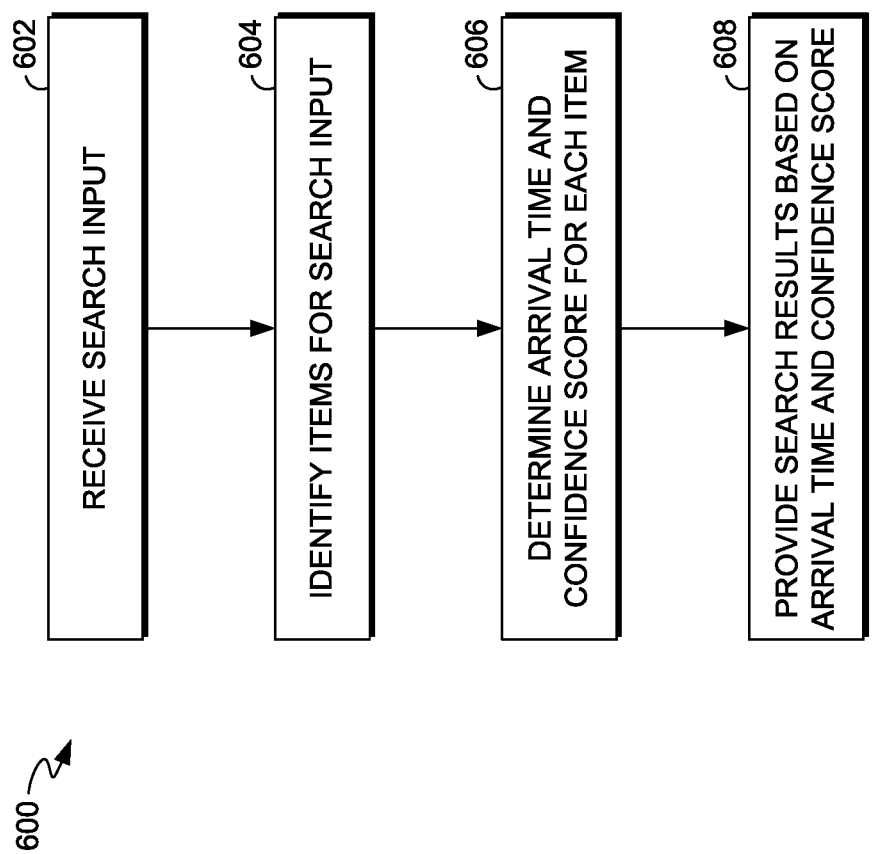
FIG. 6 is a flow diagram showing a method for using arrival times as a search facet in accordance with some implementations of the present disclosure.

With reference now to FIG. 6, a flow diagram is provided that illustrates a method 600 for searching items using arrival times. The method 600 can be performed, for instance, by the search system 104 of FIG. 1. Each block of the method 600 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 602, search input is received. The search input can comprise, for instance, a user query (e.g., a text-based, voice-based, image-based query) and/or a browse selection. For instance, a user could input a search query, such as "kids shoes", or the user could browse to view a category of items, such as "Women's Shoes." Items relevant to the search input are identified, as shown at block 604. For instance, items listed in an item listings datastore (such as the item listings datastore 122 of FIG. 1) that satisfy the search input could be identified. As shown at block 606, an arrival time and confidence score is determined for each item identified at block 604. In some aspects, the arrival time and confidence score are predicted using a trained machine learning model, such as that discussed below with reference to FIG. 7. In some aspects, multiple arrival times and confidence scores for a given item are determined. In some aspects, an arrival time and associated confidence score for an item is determined based on other input, such as a specified environmental score and/or delivery cost.

As shown at block 608, search results are provided for presentation based on the arrival times and confidence scores determined for the items. In some aspects, this includes showing an arrival time (with or without associated confidence score or confidence information) with each search result. For instance, a set of search results for shoes could present an arrival time for each item. In some aspects, the arrival times and/or corresponding confidence scores are used as a search facet to select/filter and/or order the search results.

Figure 7:
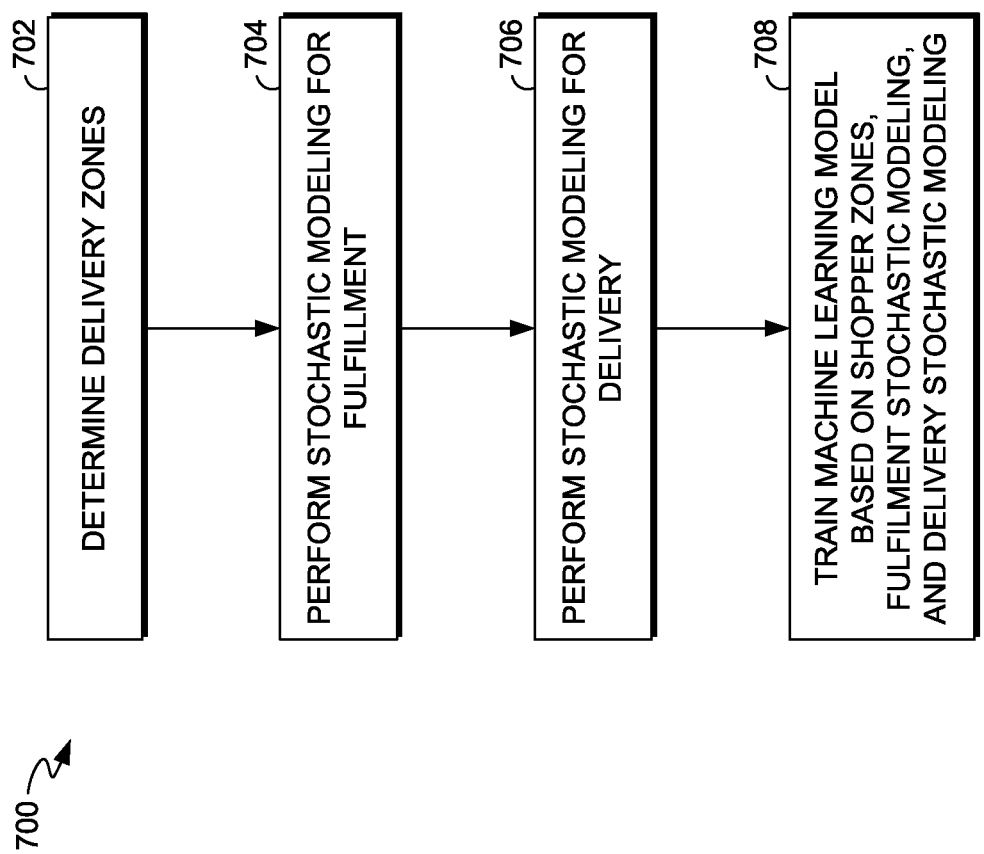
FIG. 7 is a flow diagram showing a method for training a machine learning model to predict arrival times and confidence scores in accordance with some implementations of the present disclosure.

FIG. 7 provides a flow diagram showing a method 700 for training a machine learning model to predict arrival times and associated confidence scores for items. As shown at block 702, delivery zone clustering is performed. In some aspects, delivery regions are clustered into zones using an unsupervised clustering algorithm, such as, for instance, a Gaussian Mixture Model or Affinity Propagation. The features used for clustering can include zip-codes, proximity to each of the warehouses, shopper traffic density per region, the frequency with which each warehouse fulfills an item in the region, and/or other features useful for delivery zones.

As shown at block 704, stochastic process modeling is performed for fulfillment using historical fulfillment data. This can include modeling the probability of a warehouse receiving a request to fulfil an item using a discrete probability distribution, such as, for instance, a Poisson process. This distribution approximates the number of incoming requests to a warehouse at a specific moment in time. This can be used to approximate the stress a warehouse experiences at a certain moment in time. The time it takes to fulfill each item can then be modeled using a suitable stochastic process, such as, for instance, the Gamma distribution.

As shown at block 706, stochastic processing modeling is performed for delivery using historical delivery data. This can include modeling each carrier's delivery times as a function of various aspects, such as, for instance, seasonality, distance from warehouse to delivery region/zone, the type of delivery service (ex. priority, express, etc.), traffic, construction, and weather.

A shown at block 708, a machine learning model is trained based on the delivery zones, fulfillment stochastic processing modeling, and delivery stochastic process modeling. The machine learning model is trained to predict arrival times for items and corresponding confidence scores associated with the arrival times.

Figure 8:
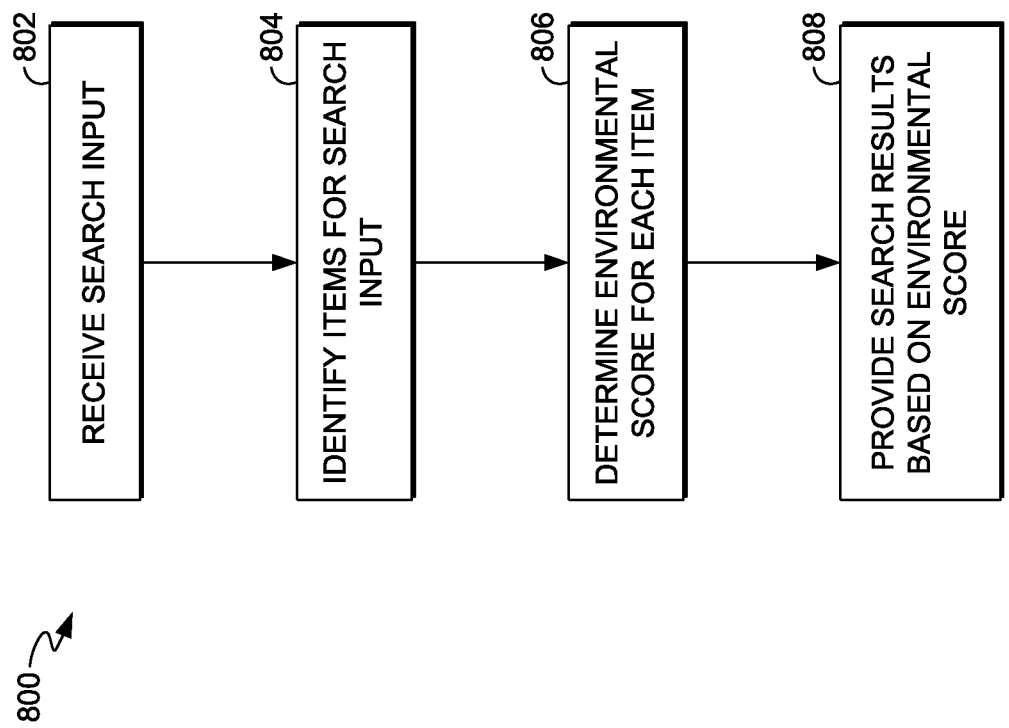
FIG. 8 is a flow diagram showing a method for using environmental scores as a search facet in accordance with some implementations of the present disclosure.

Turning next to FIG. 8, a flow diagram is provided showing a method 800 for searching items using environmental scores. As shown at block 802, search input is received. The search input can comprise, for instance, a user query (e.g., a text-based, voice-based, image-based query) and/or a browse selection. For instance, a user could input a search query, such as "kids shoes", or the user could browse to view a category of items, such as "Women's Shoes." Items relevant to the search input are identified, as shown at block 804. For instance, items listed in an item listings datastore (such as the item listings datastore 122 of FIG. 1) that satisfy the search input could be identified. As shown at block 806, an environmental score is determined for each item identified at block 804. In some aspects, multiple environmental scores for a given item are determined. In some aspects, an environmental score for an item is determined based on other input, such as a specified arrival time and/or delivery cost.

As shown at block 808, search results are provided for presentation based on the environmental scores determined for the items. In some aspects, this includes showing an environmental score with each search result. For instance, a set of search results for shoes could present an environmental score for each item. In some aspects, the environmental scores are used as a search facet to select/filter and/or order the search results.

Figure 9:
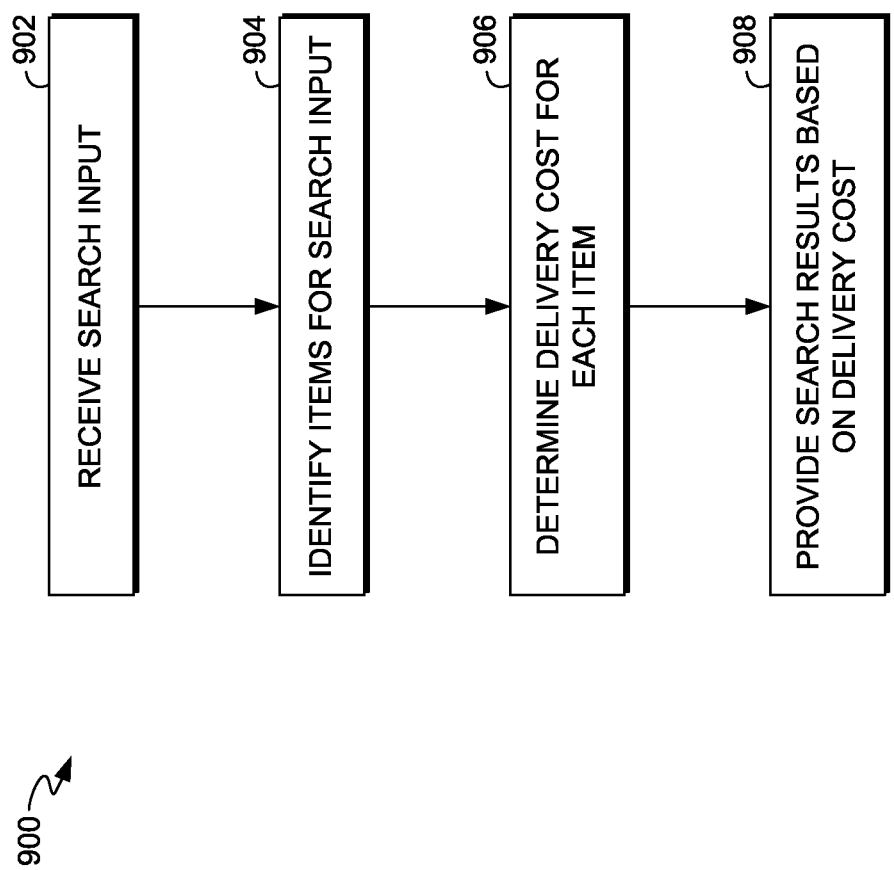
FIG. 9 is a flow diagram showing a method for using delivery cost as a search facet in accordance with some implementations of the present disclosure.

FIG. 9 provides a flow diagram showing a method 900 for searching items using delivery costs. As shown at block 902, search input is received. The search input can comprise, for instance, a user query (e.g., a text-based, voice-based, image-based query) and/or a browse selection. For instance, a user could input a search query, such as "kids shoes", or the user could browse to view a category of items, such as "Women's Shoes." Items relevant to the search input are identified, as shown at block 904. For instance, items listed in an item listings datastore (such as the item listings datastore 122 of FIG. 1) that satisfy the search input could be identified. As shown at block 906, a delivery cost is determined for each item identified at block 904. In some aspects, multiple delivery costs for a given item are determined. In some aspects, a delivery cost for an item is determined based on other input, such as a specified arrival time and/or environmental score.

As shown at block 908, search results are provided for presentation based on the delivery costs determined for the items. In some aspects, this includes showing a delivery cost with each search result. For instance, a set of search results for shoes could present a delivery cost for each item. In some aspects, the delivery costs are used as a search facet to select/filter and/or order the search results.

Figure 10:
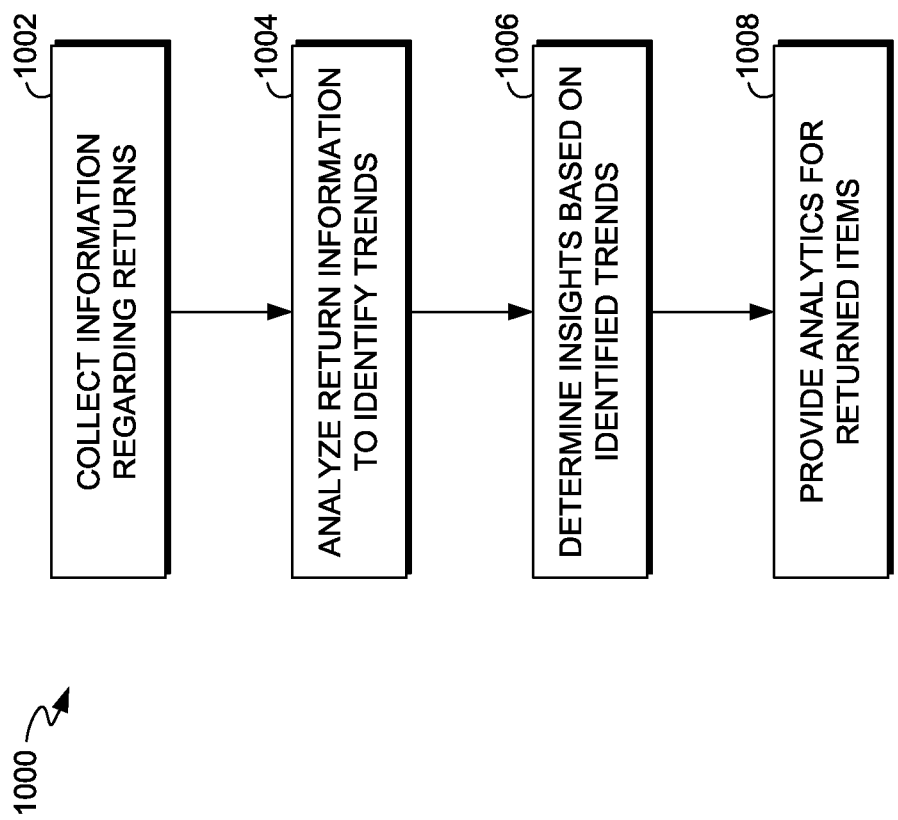
FIG. 10 is a flow diagram showing a method for providing returned items analytics in accordance with some implementations of the present disclosure.

With reference now to FIG. 10, a flow diagram is provided that shows a method 1000 for providing returned item analytics. As shown at block 1002, information regarding return items is collected. The information collected for returned items can include, for instance, item attributes (color, size, etc.), delivery information (e.g., actual arrival time versus arrival time indicated at purchase), condition of delivered item and/or packaging (e.g., damaged), buyer demographics (e.g., geographical location, age, gender, etc.), and reasons for return submitted by buyers.

The information collected for returned items is analyzed to identify trends, as shown at block 1004. This can be on a per-item basis (i.e., analyzing information for a specific item) or an item-type basis (i.e., analyzing information for a category of items). In particular, trends can be identified based on correlations amongst collected information for an item/category of items. These trends can correspond to why items were returned. By way of example to illustrate, the trends can indicate delayed arrival times, poor packaging leading to damage, description of an item wasn't accurate, and product features don't match user preferences for certain demographics.

As shown at block 1006, insights are identified based on the trends. This can include, for instance, information regarding actions to take to reduce returns. By way of example, the insights can include information such as how to adjust an item description, use different packaging, work with different carrier, how to target items to different demographics, and where to stock items.

Analytics regarding returned items are provided, as shown at block 1008. Various analytics, including, for instance, identified trends, insights, and return times, can be provided for presentation to a merchant such that the merchant can take actions based on the analytics.

Exemplary Operating Environment

Having described implementations of the present disclosure, an exemplary operating environment in which embodiments of the present technology can be implemented is described below in order to provide a general context for various aspects of the present disclosure. Referring initially to FIG. 11 in particular, an exemplary operating environment for implementing embodiments of the present technology is shown and designated generally as computing device 1100. Computing device 1100 is but one example of a suitable computing environment and is not intended to suggest any limitation as to the scope of use or functionality of the technology. Neither should the computing device 1100 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 11, computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what can be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 11 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. The memory can be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which can be built in. Illustrative components include a microphone, joystick, game pad, satellite dish, scanner, printer, wireless device, etc. The I/O components 1120 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 1100. The computing device 1100 can be equipped with depth cameras, such as, stereoscopic camera systems, infrared camera systems, RGB camera systems, and combinations of these for gesture detection and recognition. Additionally, the computing device 1100 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:
   identifying a plurality of items based on search input;
   determining an environmental impact score for each item of the plurality of items, the environmental impact score indicating an estimated environmental effect of delivering each item;
   determining an arrival time and associated confidence score for each item from the plurality of items;
   in response to a selection of one or more user interface elements to view the plurality of items sorted by arrival time and filtered on environmental score, generating ordered search results for the plurality of items by filtering the plurality of items based on environmental impact score to provide a filtered set of items and ordering the filtered set of items using a primary sort on arrival time and a secondary sort on associated confidence score such that a subset of items with a same arrival time are ordered based on the associated confidence score for each item from the subset of items;
   generating a search results page with the ordered search results, wherein each search result on the search results page provides an indication of a corresponding item from the plurality of items and also provides an indication of the arrival time for the corresponding item and natural language text based on the associated confidence score for the corresponding item; and providing the search results page with the ordered search results for the plurality of items in response to the search input.

2. The one or more computer storage media of claim 1, wherein the operations further comprise receiving an input indicating a user-specified arrival time, and wherein the plurality of items are selected based at least in part on the arrival time and associated confidence score for each item from the plurality of items satisfying the user-specified arrival time.

3. The one or more computer storage media of claim 1, wherein the operations further comprise receiving a user-specified delivery cost, and wherein determining an arrival time and associated confidence score for each item from the plurality of items comprises determining an arrival time and associated confidence score for a first item from the plurality of items based on the user-specified delivery cost.

4. The one or more computer storage media of claim 1, wherein the operations further comprise receiving a user-specified delivery cost, and wherein each item for the plurality of items has a corresponding delivery cost that satisfies the user-specified delivery cost.

5. The one or more computer storage media of claim 1, wherein the arrival time and associated confidence score for each item from the plurality of items is determined using a machine learning model trained on historical fulfillment data and historical delivery data.

6. The one or more computer storage media of claim 5, wherein the machine learning model is trained by:
   determining a plurality of delivery zones;
   performing stochastic process modeling for fulfillment based on the historical fulfillment data;
   performing stochastic process modeling for delivery based on the historical delivery data; and
   training the machine learning model using the plurality of delivery zones, the stochastic process modeling for fulfillment, and the stochastic process modeling for delivery.

7. A computer-implemented method comprising:
   identifying, by a search component, a plurality of items based on search input;
   determining an environmental impact score for each item of the plurality of items, the environmental impact score indicating an estimated environmental effect of delivering each item;
   determining, in real-time by a machine learning model trained on historical fulfillment data and historical delivery data, an arrival time and associated confidence score for each item from the plurality of items;
   selecting, by the search component, a portion of the plurality of items based on the arrival times and associated confidence scores for the portion of the plurality of items satisfying a specified arrival time and satisfying a specified environmental impact score;
   in response to a selection of a user interface element to view the portion of the plurality of items sorted by arrival time, generating ordered search results for the portion of the plurality of items by ordering the portion of the plurality of items using a primary sort on arrival time and a secondary sort on associated confidence score such that a subset of items with a same arrival time are ordered based on the associated confidence score for each item from the subset of items;
   generating a search results page with the ordered search results, wherein each search result on the search results page provides an indication of a corresponding item from the portion of the plurality of items and also provides an indication of the arrival time for the corresponding item and natural language text based on the associated confidence score for the corresponding item; and
   providing, by a user interface component, the search results page with the ordered search results comprising the portion of the plurality of items.

8. The computer-implemented method of claim 7, wherein the method further comprises receiving user input indicating the specified arrival time via a filter option provided on a user interface.

9. The computer-implemented method of claim 7, wherein the machine learning model is trained by:
   determining a plurality of delivery zones;
   performing stochastic process modeling for fulfillment based on the historical fulfillment data;
   performing stochastic process modeling for delivery based on the historical delivery data; and
   training the machine learning model using the plurality of delivery zones, the stochastic process modeling for fulfillment, and the stochastic process modeling for delivery.

10. A computer system comprising:
    a processor; and
    a computer storage medium storing computer-useable instructions that, when used by the processor, causes the computer system to perform operations comprising:
    receiving, by a user interface component, search input;
    identifying, by a search component, a plurality of items based on the search input;
    determining, by an arrival time component, an arrival time and associated confidence score for each item from the plurality of items;
    determining, by an environment score component, an environmental impact score for each item from the plurality of items, the environmental impact score indicating an estimated environmental effect of delivering each item;
    selecting a portion of the plurality of items based on the arrival time and the environmental score for each item from the subset of items;
    in response to a selection of a user interface element to view the portion of the plurality of items sorted by arrival time, generating ordered search results for the portion of the plurality of items by ordering the portion of the plurality of items using a primary sort on arrival time and a secondary sort on associated confidence score such that a subset of items with a same arrival time are ordered based on the associated confidence score for each item from the subset of items;
    generating a search results page with the ordered search results, wherein each search result on the search results page provides an indication of a corresponding item from the portion of the plurality of items and also provides an indication of the arrival time for the corresponding item and natural language text based on the associated confidence score for the corresponding item; and
    providing the search results page with the ordered search results for the portion of the plurality of items in response to the search input.

11. The computer system of claim 10, wherein selecting the portion of the plurality of items comprises determining the arrival time for each item from the portion of the plurality of items satisfies a specified arrival time.

12. The computer system of claim 10, wherein selecting the portion of the plurality of items comprises determining the environmental impact score for each item from the portion of the plurality of items satisfies a specified environmental impact score.

\* \* \* \* \*